(12) United States Patent
Bak

(10) Patent No.: US 11,512,859 B2
(45) Date of Patent: Nov. 29, 2022

(54) AIR PURIFICATION AND DEHUMIDIFICATION APPARATUS USING SOLAR ENERGY

(71) Applicant: MIR G&I CO., LTD., Cheonan-si (KR)

(72) Inventor: Chung Hyun Bak, Cheonan-si (KR)

(73) Assignee: MIR G&I CO., LTD., Cheonan-si (KR)

( * ) Notice: Subject to any disclaimer, the term of this patent is extended or adjusted under 35 U.S.C. 154(b) by 308 days.

(21) Appl. No.: 16/886,212

(22) Filed: May 28, 2020

(65) Prior Publication Data
US 2021/0116139 A1 Apr. 22, 2021

(30) Foreign Application Priority Data
Oct. 18, 2019 (KR) .................. 10-2019-0129515

(51) Int. Cl.
*B01D 53/02* (2006.01)
*F24F 11/30* (2018.01)
(Continued)

(52) U.S. Cl.
CPC .............. *F24F 11/30* (2018.01); *B01D 53/06* (2013.01); *B01D 53/261* (2013.01); *F24F 3/14* (2013.01);
(Continued)

(58) Field of Classification Search
CPC ........ B01D 2253/106; B01D 2253/108; B01D 2257/708; B01D 2257/80;
(Continued)

(56) References Cited

U.S. PATENT DOCUMENTS 5,167,679 A * 12/1992 Maekawa .............. B01D 53/06
  96/144
5,512,083 A * 4/1996 Dunne ................... B01D 53/06
  95/143
(Continued)

FOREIGN PATENT DOCUMENTS

KR 10-2013-0123167 A 11/2013
KR 10-1507140 B1 3/2015
(Continued)

*Primary Examiner* — Christopher P Jones
(74) *Attorney, Agent, or Firm* — Novick, Kim & Lee PLLC; Jae Youn Kim (57) ABSTRACT

Air purification and dehumidification apparatus includes a first cooler that cools air introduced through a first inlet, a first rotor that primarily adsorbs and absorbs VOCs and moisture contained in the air cooled by the first cooler, an air conditioning unit that cools or heats the air primarily purified and dehumidified by the first rotor, a blower that moves the air cooled or heated by the air conditioning unit, a second rotor that adsorbs and absorbs VOCs and moisture remaining in the air moved by the blower, a second cooler that re-cools the air secondarily purified and dehumidified by the second rotor, a first heating unit that heats air that is introduced through a second inlet and is then supplied to the first rotor, using sequentially solar energy and electric energy, and a third cooler that condenses air containing the VOCs and moisture that are released from the first rotor.

5 Claims, 5 Drawing Sheets (51) Int. Cl.
*B01D 53/06* (2006.01)
*B01D 53/26* (2006.01)
*F24F 3/14* (2006.01)
*F24F 3/16* (2021.01)
*F24F 110/20* (2018.01)
*F24F 140/60* (2018.01)
*F24F 110/50* (2018.01)
*F24F 110/66* (2018.01)
*F24F 5/00* (2006.01)

(52) U.S. Cl.
CPC .......... *F24F 3/16* (2013.01); *B01D 2253/108* (2013.01); *B01D 2257/708* (2013.01); *B01D 2257/80* (2013.01); *B01D 2259/4009* (2013.01); *B01D 2259/4508* (2013.01); *B01D 2259/652* (2013.01); *B01D 2259/802* (2013.01); *F24F 2003/1446* (2013.01); *F24F 2003/1458* (2013.01); *F24F 2005/0067* (2013.01); *F24F 2110/20* (2018.01); *F24F 2110/50* (2018.01); *F24F 2110/66* (2018.01); *F24F 2140/60* (2018.01); *F24F 2203/02* (2013.01)

(58) Field of Classification Search
CPC .... B01D 2259/4009; B01D 2259/4508; B01D 2259/652; B01D 2259/802; B01D 53/06; B01D 53/261; B01D 53/30; F24F 11/30; F24F 11/50; F24F 11/61; F24F 2003/1446; F24F 2003/1458; F24F 2005/0064; F24F 2005/0067; F24F 2110/10; F24F 2110/12; F24F 2110/20; F24F 2110/50; F24F 2110/66; F24F 2120/10; F24F 2120/12; F24F 2140/60; F24F 2203/02; F24F 3/14; F24F 3/1423; F24F 3/16; Y02A 50/20; Y02B 30/70
See application file for complete search history.

(56) References Cited

U.S. PATENT DOCUMENTS

| | | | | |
|---|---|---|---|---|
| 7,089,763 | B2* | 8/2006 | Forsberg | F24F 1/027 62/635 |
| 2006/0288709 | A1* | 12/2006 | Reidy | F25B 21/02 62/3.4 |
| 2007/0295021 | A1* | 12/2007 | Tyls | E03B 3/28 62/317 |
| 2008/0168789 | A1* | 7/2008 | Jones | B01D 5/0039 62/291 |
| 2014/0053580 | A1* | 2/2014 | Ferreira | F25D 21/06 62/140 |
| 2014/0260389 | A1* | 9/2014 | Sistla | F28D 1/0477 62/222 |
| 2018/0154303 | A1* | 6/2018 | Giles | B01D 53/0454 |
| 2018/0209123 | A1* | 7/2018 | Bahrami | B01D 5/0075 |
| 2018/0221810 | A1* | 8/2018 | Chang | B01D 53/06 |
| 2019/0193019 | A1* | 6/2019 | Okano | F24F 7/06 |
| 2019/0344214 | A1* | 11/2019 | Friesen | E03B 3/28 |
| 2022/0136270 | A1* | 5/2022 | Gamboa | G05D 21/02 4/490 |

FOREIGN PATENT DOCUMENTS

KR   10-2017-0044503 A   4/2017
KR         10-1811981 B1   12/2017

* cited by examiner

AIR PURIFICATION AND DEHUMIDIFICATION APPARATUS USING SOLAR ENERGY

CROSS REFERENCE TO RELATED APPLICATION

The present application claims priority to Korean Patent Application No. 10-2019-0129515, filed Oct. 18, 2019, the entire contents of which is incorporated herein for all purposes by this reference.

BACKGROUND OF THE INVENTION

Field of the Invention

The present invention relates to an air purification and dehumidification apparatus using solar energy. More particularly, the present invention relates to an air purification and dehumidification apparatus using solar energy as a portion of energy necessary for a heating process of removing volatile organic compounds (VOCs) and water that are collected in the apparatus during an air conditioning process in which VOCs contained in incoming air are adsorbed to produce purified air and moisture contained in the purified air is absorbed to produce dehumidified air.

Description of the Related Art

Nowadays, air purification apparatuses that purify air using an air filter or the like and air dehumidification apparatuses that dehumidify indoor air using a dehumidifying agent or the like are widely used in various places, such as homes, offices, and factories to create a comfortable indoor environment.

The basic principle that applies to these air purification apparatuses or air dehumidification apparatuses is one of the well-known principles. However, air purification apparatuses or air dehumidification apparatuses vary in efficiency due to their different internal structures and energy resources that are used for purification or dehumidification.

Therefore, various attempts have been made to improve the air purification or dehumidification effect and efficiency of an apparatus by improving the internal structure of the apparatus, an energy resource used by the apparatus, and/or a way in which the apparatus uses an energy resource. Examples of the related art include Korean Patent Application Publication No. 10-2013-0123167 titled "DEHUMIDIFICATION SYSTEM UTILIZING HEATER AND WASTE HEAT AND METHOD OF MANAGING SAME", Korean Patent No. 10-1507140 titled "HYBRID DEHUMIDIFIER HAVING STRUCTURE FOR USING WASTE HEAT FROM COMPRESSOR", Korean Patent No. 10-1811981 titled "AIR CONDITIONER HAVING FUNCTION OF REUSING WASTE HEAT", and Korean Patent Application Publication No. 10-2017-0044503 titled "AIR CONDITIONING SYSTEM USING PNEUMATIC SOLAR-ENERGY PREHEATING MODULE".

In Korean Patent Application Publication No. 10-2013-0123167 titled "DEHUMIDIFICATION SYSTEM UTILIZING HEATER AND WASTE HEAT AND METHOD OF MANAGING SAME", in addition to the basic components of a dehumidifier, including an evaporator, a compressor, a condenser, and an expansion valve, the dehumidification system includes a heater that heats air introduced from the outside, a heat exchanger that increases the temperature of the introduced air through heat exchange between the air and waste heat occurring in the compressor and supplies the resulting air to the evaporator, and an on-off value for allowing or preventing introduction of the waste heat from the compressor into the heat exchanger. With this configuration of the system, an energy cost in a painting workshop can be saved. In Korean Patent No. 10-1507140 titled "HYBRID DEHUMIDIFIER HAVING STRUCTURE FOR USING WASTE HEAT FROM COMPRESSOR", in addition to the basic components of a dehumidifier, including a condenser, an evaporator, a compressor, and a dehumidification rotor, the hybrid dehumidifier includes a main flow path along which air heated by the condenser is guided to a regeneration unit of the dehumidification rotor, and a heat dissipation flow path along which heat dissipation air heated by heat from the compressor is guided to the main flow path. In the hybrid dehumidifier, the heat generated by the compressor is used to regenerate the dehumidification rotor. With this configuration of the hybrid dehumidifier, energy saving and effective dehumidification can be achieved.

In addition, in Korean Patent Application Publication No. 10-2017-0044503 titled "AIR CONDITIONING SYSTEM USING PNEUMATIC SOLAR-ENERGY PREHEATING MODULE", an air conditioning system includes an air handling unit that heats or cools an air heat source, thus adjusts temperature thereof, filters the air heat source, and then blows the air heat source in such a manner as to be discharged toward indoor space of a building, and a preheating module that is provided in such a manner as to be mountable on an external wall of a building, forms air gap space within which air is movable, thermally transfers a solar energy source to the air gap space, collects heat in such a manner as to heat air, and supplies a heated air source toward the air handling unit. With this configuration, the air conditioning system efficiently operates in conjunction with an existing air conditioning equipment of a building. Thus, the effectiveness and reliability of the preheating module can be greatly improved, and the ventilation efficiency of ventilation equipment within a building can be improved. In Korean Patent No. 10-1811981 titled "AIR CONDITIONER HAVING FUNCTION OF REUSING WASTE HEAT", an air conditioner does not need a heat pump consuming much power, and thus energy can be saved. The air conditioner performs heat exchange for cooling, collects heated air to be discharged to the outside, mixes the collected heated air with outdoor air, and recirculates the resulting mixture. With this improved structure, the efficiency of using heat energy can be increased.

However, the technologies mentioned above do not improve the effect and the efficiency in both purification and dehumidification of indoor air. Therefore, there is a requirement for developing an apparatus that is capable of further improving the effect and efficiency of purifying and dehumidifying indoor air.

SUMMARY OF THE INVENTION

An objective of the present invention is to provide an apparatus that is capable of concurrently purifying and dehumidifying indoor air and thus further improving the effect of and the efficiency of purifying and dehumidifying indoor air.

According to an aspect of the present invention, there is provided an air purification and dehumidification apparatus using solar energy, the apparatus including: a first cooler that cools air introduced from the outside through a first inlet formed in a first side of the air purification and dehumidification apparatus; a first rotor that adsorbs volatile organic compounds (VOCs) contained in the air cooled by the first cooler and dehumidifies the air; an air conditioning unit that cools or heats the air that is primarily purified and dehumidified by the first rotor; a blower that moves the air cooled or heated by the air conditioning unit; a second rotor that adsorbs VOCs remaining in the air moved by the blower and dehumidifies the air; a second cooler that re-cools the air that is secondarily purified and dehumidified by the second rotor; a first heating unit that heats air that is introduced from the outside through a second inlet formed in a second side of the air purification and dehumidification apparatus and is then supplied to the first rotor, using sequentially solar energy and electric energy so that the first rotor can be regenerated; and a third cooler that condenses VOCs and moisture that are discharged from the first rotor.

With the presence of the first rotor and the second rotor that contain silica and zeolite, the air purification and dehumidification apparatus according to the present invention can almost perfectly remove both volatile organic compounds and moisture contained in air by performing two removal processes. With the first heating unit and the second heating unit that supply heated and thus dried air to the first rotor and the second rotor, respectively, the first rotor and the second rotor can be regenerated and a dehumidification effect can be improved. Since each of the first heating unit and the second heating unit is equipped with the solar-energy heater of which a heat source is solar energy, non-renewable energy resources necessary to heat air can be saved.

DETAILED DESCRIPTION OF THE INVENTION

Figure 1:
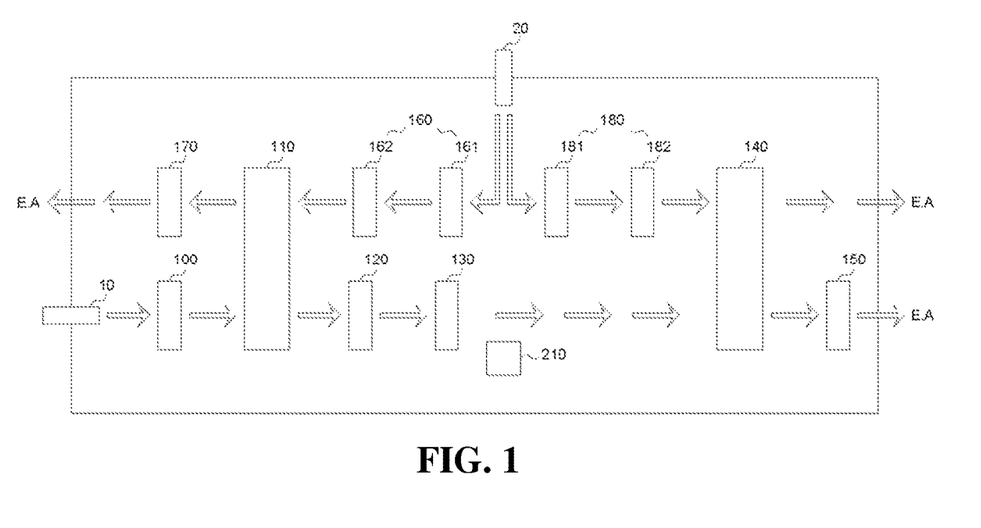
FIG. 1 is a diagram illustrating an air purification and dehumidification apparatus using solar energy according to the present invention.

The present invention relates to a system that uses solar energy in a process of purifying and dehumidifying air. More particularly, the present invention relates to an air purification and dehumidification apparatus that uses solar energy. The air purification and dehumidification apparatus includes a first cooler 100, a first rotor 110, an air conditioning unit 120, a blower 130, a second rotor 140, a second cooler 150, a first heating unit 160, and a third cooler 170. The first cooler 100 cools air that is introduced from the outside through a first inlet 10 formed in a first side of the air purification and dehumidification apparatus. The first rotor 110 adsorbs volatile organic compounds (VOCs) contained in the air cooled by the first cooler 100 and dehumidifies the air. The air conditioning unit 120 cools or heats the air that is primarily purified and dehumidified by the first rotor 110. The blower 130 moves the air that is cooled or heated by the air conditioning unit 120. The second rotor 140 adsorbs VOCs remaining in the air moved by the blower 130 and dehumidifies the air. The second cooler 150 re-cools the air that is perfectly purified and dehumidified by the second rotor 140. The first heating unit 160 heats air that is introduced from the outside through a second inlet formed in a second side of the air purification and dehumidification apparatus and is then supplied to the first rotor 110, using sequentially solar energy and electric energy, in such a manner that the first rotor 110 is regenerated. The third cooler 170 condenses VOCs and moisture that are discharged from the first rotor 110.

Embodiments of the present invention will be described in detail below with reference to the accompanying drawings.

First, as illustrated in FIG. 1, the first cooler 100 is a device that cools the air that is introduced from the outside through the first inlet 10 formed in a first side of the air purification and dehumidification apparatus according to the present invention. The first cooler 100 a first time lowers temperature of air heated under the influence of ambient temperature in summer. Thus, cool air that results from gradual cooling thereafter is discharged out of the air purification and dehumidification apparatus.

Figure 2:
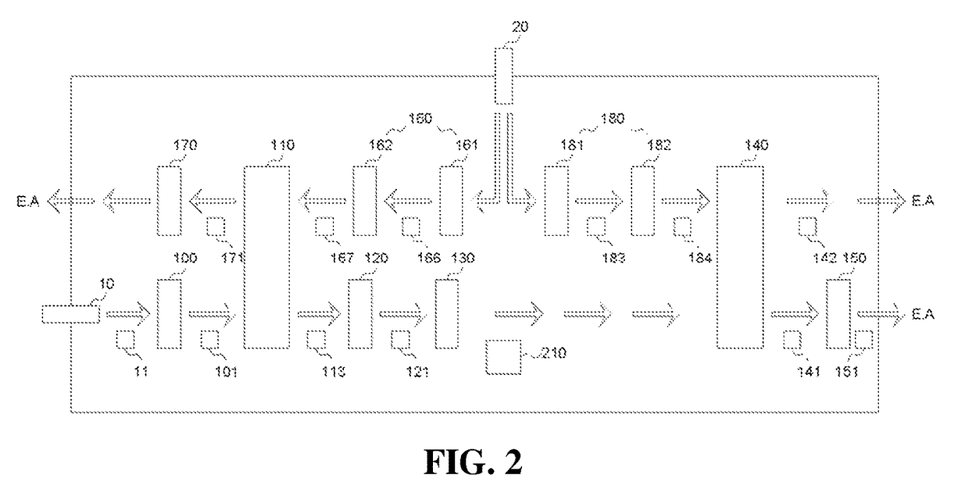
FIG. 2 is a perspective diagram illustrating a first rotor that constitutes the air purification and dehumidification apparatus using solar energy according to the present invention.

In this case, as illustrated in FIG. 2, a sensor that measures temperature and humidity of the air that is introduced from the outside is provided on the first inlet side. This sensor is referred to as a first sensor 11 to be distinguished from the other sensors that will be described below.

However, in FIG. 2, it is illustrated that the first sensor 11 is provided within the air purification and dehumidification apparatus. However, the first sensor 11 may be provided out of the air purification and dehumidification apparatus.

Figure 3:
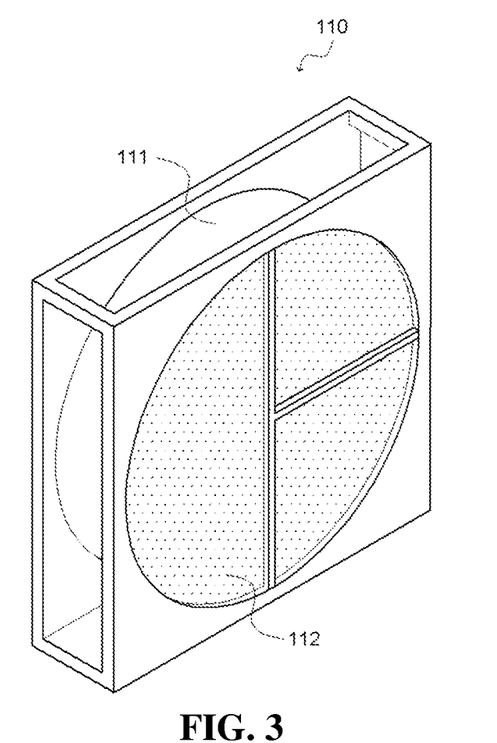
FIG. 3 is a configuration diagram illustrating a state where first to twelfth sensors are additionally provided to the air purification and dehumidification apparatus using solar energy according to the present invention.

In addition, the first rotor 110 is a device that a first time removes volatile organic compounds (VOCs) and moisture that are contained in the air first cooled by the first cooler 100. As illustrated in FIG. 3, the first rotor 110 includes a rotation portion 111 and adsorption portions 112. The cylinder-shaped rotation portion 111 has an open internal hole inside and is rotated by a motor. The adsorption portions 112 are inserted into both end portions, respectively, of the open internal hole in the rotation portion 111, and thus constitute both flank surfaces, respectively, of the rotation portions 111. The adsorption portions 111 adsorb VOCs contained in the air and absorbs moisture contained in the air.

Therefore, preferably, the both end portions of the open hole in the rotation unit 111 are positioned on the same horizontal line along an air-moving direction in such a manner that the air introduced from the outside through the first inlet 10 passes through the open hole and moves toward the air conditioning unit 120. The adsorption portions 112, multiple through-holes in each of which are formed to allow air to pass through, are provided in such a manner as to be inserted into the both end portions, respectively, of the open hole.

In this case, the adsorption portion 112 is formed into the shape of a fine mesh screen generally used in filters, but is not necessarily limited to this shape. The adsorption portion 112 may be formed of various materials such as fabric.

In addition, the adsorption portion 112 contains silica and zeolite that have excellent performance in adsorbing VOCs. Such silica and zeolite also have the excellent effect of dehumidifying air, in addition to the property of adsorbing VOCs. Most of the VOCs and some or a considerable amount of the moisture, which are contained in air passing through the both flank surfaces of the first rotor 110, are removed.

In the case where the first rotor 110 is rotated by the motor, a timing pulley is fastened to the shaft of the motor, and a timing belt encompasses both the timing pulley and the first rotor 110. However, the rotation of the first rotor 110 is not limited to this way.

In addition, a sensor that measures the temperature and humidity of the air cooled by the first cooler 100 and the concentration of VOCs contained in the air is provided between the first cooler 100 and the first rotor 110. This sensor is referred to as a second sensor 101 to be distinguished from the other sensors.

In addition, the air conditioning unit 120 is a device that cools or heats the air from which most of the VOCs and at least some or a considerable amount of the moisture are removed by the first rotor 110. As illustrated in FIG. 1, the air conditioning unit 120 is positioned next to the first rotor 110 in terms of the flowing direction of the air introduced inward through the first inlet 10. The air conditioning unit 120 includes both a cooling coil and a heating coil.

The cooling coil and the heating coil are configured in such a manner that one of them selectively operates to cool or heat the air within the air purification and dehumidification apparatus.

In this case, which one of the cooling coil and the heating coil is selected for operation depends on the temperature of the air introduced inward from the outside through the first inlet 10, that is, the temperature measured by the first sensor 11. However, this selection condition is changeable anytime by a control device provided in the air purification and dehumidification apparatus itself or according to user's selection.

In addition, a sensor that measures the temperature and humidity of the air from which VOCs and moisture are primarily removed by the first cooler 110 and the concentration of VOCs contained in the air is provided between the first cooler 110 and the air conditioning unit 120. This sensor is referred to as a third sensor 113 to be distinguished from the other sensors.

In addition, the blower 130 is a device that blows air by rotation of a fan. As illustrated in FIG. 1, the blower 130 is installed between the air conditioning unit 120 and the second rotor 140 and sends air toward the second rotor 140.

Accordingly, the air that is cooled or heated by the air conditioning unit 120 quickly moves toward the second rotor 140 without staying within the air purification and dehumidification apparatus.

In this case, a sensor that measures the temperature and humidity of the air cooled or heated by the air conditioning unit 120 is provided between the air conditioning unit 120 and the blower 130. This sensor is referred to as a fourth sensor 121 to be distinguished from the other sensors.

In addition, the second rotor 140 is a device that removes the remaining VOCs and moisture in the air moved by the blower 130 by adsorbing the VOCs and absorbing the moisture. The second rotor 140 includes the rotation portion 111 and the adsorption portion 112. The cylinder-shaped rotation portion 111, like that of the first rotor 110, has an open internal hole inside and is rotated by a motor. The adsorption portions 112 respectively cover both ends of the open internal hole formed to extend from one end to the other in the rotation portion 111. The adsorption portions 112 constitute both flank surfaces, respectively, of the rotation portion 111. The adsorption portions 111 adsorb VOCs and moisture contained in the air.

Accordingly, the first rotor 100 primarily removes most of the VOCs and some amount of or a considerable amount of the moisture from the air introduced into the air purification and dehumidification apparatus. Then, the air in this state moves toward the second rotor 140. The second rotor 140 secondarily removes both VOCS and moisture that remain in the air, by rotating in the same manner as the first rotor 110. Thus, the air that is perfectly purified and dehumidified through the primary and secondary purification-and-dehumidification stages can be ejected from the air purification and dehumidification apparatus.

In this case, as illustrated in FIG. 1, the second cooler 150 that re-cools the air purified and dehumidified by the second rotor 140 is provided at the next stage to the second rotor 140. The second cooler 150 is configured to operate only in a case where the cooling coil of the air conditioning unit 120 operates to cool the air passing through the first rotor 110.

That is, the first cooler 100 is a device that re-cools the air that is cooled by the cooling coil, is blown by the blower 130, and is heated to a somewhat high temperature after being purified and dehumidified as a result of passing through the second rotor 140. In a case where the heating coil operates, there is no benefit of cooling the air. The first cooler 100 is configured in such a manner as not to operate in such a case.

In this case, a sensor that measures the temperature and humidity of the air from which VOCs and moisture are removed by the second rotor 140 and the concentration of VOCs contained in the air is provided between the second rotor 140 and the first cooler 100. This sensor is referred to as a fifth sensor 141 to be distinguished from the other sensors. Furthermore, a sensor that measures the temperature and humidity of the air cooled by the second cooler 150 is provided at the subsequent stage to the second cooler 150. This sensor is referred to as a sixth sensor 151 to be distinguished from the other sensors.

On the other hand, the temperature and humidity of the air measured by each of the first sensor 11, the fourth sensor 121, and the sixth sensor 151 are displayed on a display device of the air purification and dehumidification apparatus and/or transmitted to a user mobile device 200. In addition, the temperature and humidity of the air and the concentration of VOCs in the air, measured by each of the second sensor 101, the third sensor 113, and the fifth sensor 141, are also displayed on the display device and/or transmitted to the user mobile device 200. To this end, an air purification and dehumidification system according to the present invention includes the air purification and dehumidification apparatus and the user mobile device 200 on which a control application is installed. With the installed control application, it is possible to monitor an operating state of the air purification and dehumidification apparatus and controls operation thereof.

Specifically, with the installed control application, the temperature and humidity of the air and the concentration of VOCs in the air, measured by the sensors in the air purification and dehumidification apparatus, are received by the user mobile device 200 and are displayed on a screen of the user mobile device 200. Furthermore, the following control signals are generated and transmitted to the air purification and dehumidification apparatus by the user mobile device 200: a control signal for adjusting at least one parameter among the temperature of the air to be ejected from the air purification and dehumidification apparatus, the humidity of the air, and the concentration of VOCs in the air; a control signal for activating and deactivating the air purification and dehumidification apparatus at preset times; a control signal for deactivating the air purification and dehumidification apparatus when a preset time elapsed from the start of operation of the air purification and dehumidification apparatus; and a control signal for activating and deactivating the air purification and dehumidification apparatus according to the temperature of, the humidity of, or the concentration of VOCs in the air introduced into the apparatus from the outside.

Therefore, the user who carries the user mobile device 200 can recognize whether or not the air purification and dehumidification apparatus normally operates on the basis of the measurement values detected by the sensors provided within the air purification and dehumidification apparatus. Furthermore, the user can adjust at least one parameter among the temperature of, the humidity of, and the concentration of VOCs in the air to be ejected into an indoor space from the air purification and dehumidification apparatus, and thus can adjust indoor temperature, humidity, and air quality. Also, the user can set control conditions in such a manner that the air purification and dehumidification apparatus automatically operates and stops at preset times that vary depending on an external environment, such as a season. Thus, indoor temperature, humidity, and air quality are automatically adjusted.

In addition, the air purification and dehumidification apparatus can be set to automatically stop operating when a preset time elapsed from the start of operation thereof or when a preset temperature, humidity, or VOC concentration is reached in a case where the operation of the air purification and dehumidification apparatus is started by the user. This prevents a waste of electricity. The air purification and dehumidification apparatus can be set to automatically stop operating when a preset temperature, humidity, or VOC concentration is reached in a case where the operation of the air purification and dehumidification apparatus is started by automatic control according to the temperature of, the humidity of, or the concentration of VOCs in the air introduced into the air purification and dehumidification apparatus from the outside. This automatically adjusts indoor temperature, humidity, and air quality.

In addition, using the user mobile device 200, the user can check the following: an operating time and an estimated power consumption of the air purification and dehumidification apparatus in operation; an estimation of an electric bill for the estimated power consumption; and operating efficiency of the air purification and dehumidification apparatus, which is computed taking into consideration the temperature of, the humidity of, and the concentration of VOCs in the air introduced into the air purification and dehumidification apparatus, the temperature of, the humidity of, and the concentration of VOCs in the air to be ejected into an indoor space from the air purification and dehumidification apparatus, the operating time, and the estimated power consumption.

In addition, the user mobile device 200 generates and transmits the control signal for adjusting at least one parameter selected from among the temperature of, the humidity of, and the concentration of VOCs in the air to be ejected from the air purification and dehumidification apparatus. Then, the user mobile device 200 measures the time it takes for the temperature of, the humidity of, or the VOC concentration in the air, which is actually ejected from the air purification and dehumidification apparatus, to reach a target value, and computes the operating efficiency of the air purification and dehumidification apparatus. In a case where the computed operating efficiency is at or below a preset level, a notification message to that effect is displayed on the screen to alert the user to that state. When this happens, the user can check whether or not the air purification and dehumidification apparatus operates in a normal manner.

Figure 4:
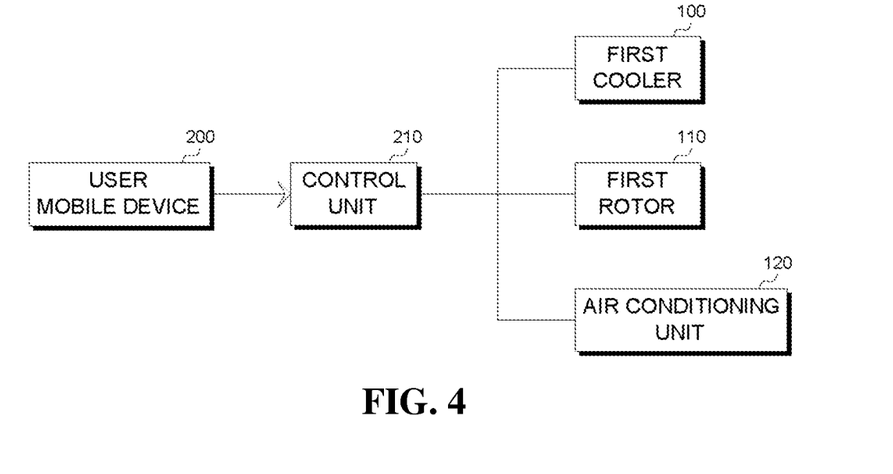
FIG. 4 is a diagram illustrating an internal structure of a solar-energy heater that constitutes the air purification and dehumidification apparatus using solar energy according to the present invention.

Accordingly, a communication unit and a control unit 210 are provided within the air purification and dehumidification apparatus. The communication unit collects measurement values that are measured by the sensors, transmits the collected measurement values to the user mobile device 200, and receives a control signal transmitted from the user mobile device 200. As illustrated in FIG. 4, the control unit 210 controls at least one of the first cooler 100, the first rotor 110, and the air conditioning unit 120, on the basis of the control signal.

On the other hand, the first rotor 110 needs to perform a regeneration process of removing the VOCs and the moisture that are captive in the adsorption portion 112 to constantly maintain good adsorption and absorption ratios for VOCs and moisture in the air. For this reason, as illustrated in FIG. 1, the first heating unit 160 that heats the air to be supplied to the first rotor 110 is provided within the air purification and dehumidification apparatus.

That is, the first heating unit 160 is a device that heats air that is introduced from the outside through the second inlet 20 formed in a second side of the air purification and dehumidification apparatus and is then supplied to the first rotor 110, using electric energy and solar energy. To this end, the first heating unit 160 includes a solar-energy heater 161 and an electric heater 162. The solar-energy heater 161 heats the air using solar energy. The electric heater 162 further heats the air heated by the solar-energy heater 161, using electric energy.

Therefore, the air that is introduced from the outside through the second inlet 20 is primarily heated by the solar-energy heater 161 to a predetermined level, is then secondarily heated by the electric heater 162 to a target level, and is subsequently sent to the second rotor 140. This heated air detaches the VOCs and the moisture that are captive in the adsorption portion 112. In this manner, the solar-energy heater 161 and the electric heater 162 operate in combination as the first heating unit 160. Thus, according to the present invention, an energy saving effect of approximately 20 to 30% is achieved when compared with a conventional way in which the air introduced through the second inlet 20 is heated only with the electric heater.

Figure 5:
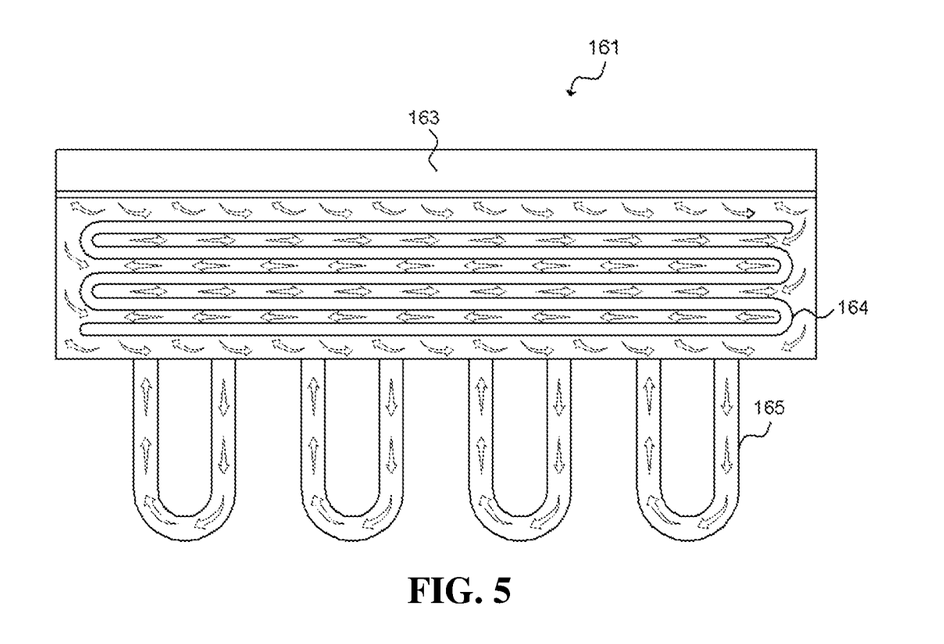
FIG. 5 is a diagram illustrating a process of controlling the air purification and dehumidification apparatus using solar energy according to the present invention, using a user mobile device.

Specifically, as illustrated in FIG. 5, the solar-energy heater 161 includes a photo-voltaic module 163 that constitutes an upper end portion thereof, a hexahedral upper portion having an internal hole serving as a flow passage for a heating medium, and a lower portion that is made up of multiple U-shaped pipes 165 that are configured to communicate with the internal hole in the upper portion. The photo-voltaic module 163 is exposed to solar light to absorb solar energy. In addition, a heating pipe through which a high-temperature gas flows is provided in the internal hole of the upper portion.

Therefore, the heating medium with which the internal hole of the hexahedral upper portion and the U-shaped pipes 165 of the lower portion are filled can be heated by performing heat exchange with the heating pipe 164 and be heated by solar energy absorbed by the photo-voltaic module 163. Accordingly, the air introduced from the outside through the second inlet 20 can be heated by performing heat exchange with the U-shaped pipes 165 while passing along a passage between each of the multiple U-shaped pipes 165.

For this reason, preferably, the multiple U-shaped pipes 165 are arranged in such a manner that the internal holes thereof are continuously connected. The multiple U-shaped pipes 165 are not necessarily limited to this arrangement.

In addition, the hexahedral upper portion of the solar-energy heater 161 is made of titanium having low thermal conductivity, and thus heat dissipation through the heat exchange is minimized. On the other hand, the U-shaped pipes 165 are made of a highly heat-conductive material such as copper or aluminum to maximize the heat exchange efficiency.

In this case, a sensor that measures the temperature of the air heated by the solar-energy heater 161 is provided between the solar-energy heater 161 and the electric heater 162 that constitute the first heating unit 160. This sensor is referred to as a seventh sensor 166 to be distinguished from the other sensors. A sensor that measures the temperature of the air heated by the electric heater 162 is provided behind the electric heater. This sensor is referred to as an eighth sensor 167 to be distinguished from the other sensors.

In addition, as illustrated in FIG. 1, the third cooler 170 is provided within the air purification and dehumidification apparatus. The third cooler 170 condenses the VOCs and the moisture that are detached from the second rotor 140 by the air that is introduced through the second inlet 20. The VOCs and moisture that are detached from the second rotor 140 are collected in a collection container provided in the air purification and dehumidification apparatus are then discharged to the outside for proper disposal. Thus, it is possible to prevent environmental pollution attributable to direct emission of the VOCs into the air.

In this case, a sensor that measures the temperature of the air that is caused to contain VOCs and moisture while passing through the second rotor 140 is provided between the second rotor 140 and the third cooler 170. Alternatively, this sensor is provided behind the third cooler 170 to measure the temperature of the air. This sensor is referred to as a ninth sensor 171 to be distinguished from the other sensors.

In addition, as illustrated in FIG. 1, the air purification and dehumidification apparatus according to the present invention further includes a second heating unit 180 that, like the first heating unit 160, includes a solar-energy heater 181 and the electric heater 182. The second heating unit 180 heats the air that is introduced from the outside through the second inlet 20 or a third inlet that is formed in a third side of the air purification and dehumidification apparatus and is then supplied to the second rotor 140. Thus, the heated air increases the temperature around the second rotor 140. Accordingly, the VOCs and moisture that are captive in the second rotor 140 are released from the second rotor 140.

Therefore, a fourth cooler is provided within the air purification and dehumidification apparatus. The fourth cooler condenses most of the VOCs and some amount of the moisture that are released from the second rotor 140 due to the air that is heated after being introduced through the second inlet 20. However, all or most of the VOCs contained in the incoming air are adsorbed by the first rotor 110. Thus, an effect in which the VOCs are adsorbed by the second rotor 140 is insignificant. Therefore, the fourth cooler is not an essential component but may be an optional component.

In addition, a sensor that measures the temperature of the air heated by the solar-energy heater 181 is provided between the solar-energy heater 181 and the electric heater 182 that constitute the second heating unit 180. This sensor is referred to as a tenth sensor 183 to be distinguished from the other sensors. A sensor that measures the temperature of the air heated by the electric heater 182 is provided behind the heater 182. This sensor is referred to as an eleventh sensor 184 to be distinguished from the other sensors.

Thereafter, the air that passes through the second rotor 140 is ejected from the air purification and dehumidification apparatus. A twelfth sensor 142 that measures the temperature of the air that passes through the second rotor 140 is provided behind the second rotor 140.

On the other hand, the temperature of the air measured by each of the seventh sensor 166, the eighth sensor 167, the ninth sensor 171, the tenth sensor 183, and the eleventh sensor 184 and the twelfth sensor 142 is also transmitted to the user mobile device 200 for displaying. With a control signal from the user mobile device 200, which is based on measurement values measured by the seventh sensor 166 to the twelfth sensor 142, the control unit 210 controls the second rotor 140, the second cooler 150, the first heating unit 160, the third cooler 170, and the second heating unit.

In addition to this, the control unit 210 automatically adjusts the temperature and humidity of the air to be ejected from the air purification and dehumidification apparatus, on the basis of the temperature and humidity of the air measured by the first sensor 11, toward respective preset values. In order to adjust the temperature and humidity of the air to be ejected from the apparatus, a configuration is employed in which the extent to which the air is heated or cooled by each of the first cooler 100, the air conditioning unit 120, the second cooler 150, the first heating unit 160, the third cooler 170 and the second heating unit 180 is controlled.

In addition, in a case where the temperature of the air, measured by the first sensor 11, is within a preset temperature range, the control unit 210 performs control in such a manner that the air introduced into the air purification and dehumidification apparatus is ejected from the apparatus without being heated or cooled by the first cooler 100, the air conditioning unit 120, and the second cooler 150. In this case, the incoming air undergoes only the purification and dehumidification performed by the first rotor 110 and the second rotor 140. With this configuration according to the present invention, an effect is achieved in which power consumption by the first cooler 100, the air conditioning unit 120, and the second cooler 150 that operate at all times is minimized.

The embodiments are described above in an exemplary manner so that the ordinarily skilled in the art to which the present invention pertains gets a thorough understanding of the technical idea of the present invention. The present invention is not limited to the embodiments described above but encompasses other possible embodiments thereof.

For clear and definite description of the present invention, a portion that is not related to the description of the present invention is omitted from the drawings. A width, length, thickness, and the like of each constituent element in the drawings are expressed in an exaggerated or reduced manner for convenience.

In addition, the same constituent element is given the same reference numeral throughout the specification.

What is claimed is:

1. An air purification and dehumidification apparatus using solar energy, the apparatus comprising:
    a first cooler that cools air introduced from the outside through a first inlet formed in a first side of the air purification and dehumidification apparatus;
    a first rotor that adsorbs volatile organic compounds (VOCs) contained in the air cooled by the first cooler and dehumidifies the air, thereby primarily purifying and dehumidifying the air;

an air conditioning unit that cools or heats the air that is primarily purified and dehumidified by the first rotor;

a blower that moves the air cooled or heated by the air conditioning unit;

a second rotor that adsorbs VOCs remaining in the air moved by the blower and dehumidifies the air, thereby secondarily purifying and dehumidifying the air;

a second cooler that re-cools the air that is secondarily purified and dehumidified by the second rotor;

a first heating unit that regenerates the first rotor by heating air that heads toward the first rotor after being introduced into the apparatus through a second inlet formed in a second side of the air purification and dehumidification apparatus, using sequentially solar energy and electric energy;

a third cooler that condenses the VOCs and moisture that are released from the first rotor;

a first sensor that is provided on the first inlet side and measures temperature and humidity of the air introduced from the outside;

a second sensor that measures temperature and humidity of the air cooled by the first cooler and concentration of VOCs;

a third sensor that measures temperature and humidity of the air from which VOCs and moisture are primarily removed by the first rotor and measures concentration of VOCs remaining in the air;

a fourth sensor that measures temperature and humidity of the air cooled or heated by the air conditioning unit;

a fifth sensor that measures temperature and humidity of the air from which VOCs and moisture are secondarily removed by the second rotor and measures concentration of VOCs remaining in the air; and a sixth sensor that measures temperature and humidity of the air cooled by the second cooler.

2. The apparatus according to claim 1, wherein each of the first rotor and the second rotor comprises:

a cylinder-shaped rotation unit that is rotated by a motor; and adsorption units that each contain silica and zeolite, constitute two flank surfaces, respectively, of the rotation unit, and deprive the air of the VOCs and moisture according to adsorption and absorption mechanisms.

3. The apparatus according to claim 1, further comprising:

a second heating unit that regenerates the second rotor by heating air that heads toward the second rotor after being introduced into the apparatus through the second inlet or a third inlet formed in a third side of the apparatus, using sequentially solar energy and electric energy.

4. The apparatus according to claim 3, wherein each of the first heating unit and the second heating unit comprises a solar-energy heater and an electric heater, wherein the solar-energy heater includes:

a photo-voltaic module that constitutes an upper end portion thereof, and absorbs solar energy;

a hexahedral upper portion that has an internal hole through which a heating medium flows and in which a heating pipe with a high-temperature gas flowing therethrough is provided; and a lower portion that is made up of multiple U-shaped pipes configured to communicate with the internal hole of the hexahedral upper portion.

5. An air purification and dehumidification system comprising:

the apparatus according to claim 1; and a user mobile device on which a control application is installed, the user mobile device performing operations of: receiving the temperature and humidity of and the concentration of VOCs in the air that is measured by each of the sensors within the apparatus and displaying the received temperature and humidity on a screen thereof; generating and transmitting a control signal for adjusting at least one parameter selected from among the temperature of, the humidity of, and the VOCs concentration in the air to be ejected from the apparatus; generating and transmitting a control signal for activating and deactivating the apparatus at preset times; generating and transmitting a control signal for deactivating the apparatus when a preset time elapsed after the apparatus is activated; and generating and transmitting a control signal for activating and deactivating the apparatus according to the temperature and humidity of, and the concentration of VOCs in, the air introduced into the apparatus from the outside.

* * * * *